United States Patent [19]

Nakano et al.

[11] Patent Number: 4,991,701
[45] Date of Patent: Feb. 12, 1991

[54] TRIPPING TORQUE SETTING MECHANISM OF OVERLOAD CLUTCH

[75] Inventors: Isamu Nakano; Shunji Fujii, both of Osaka, Japan

[73] Assignee: Tsubakimoto Emerson Co., Osaka, Japan

[21] Appl. No.: 477,614

[22] Filed: Feb. 9, 1990

[30] Foreign Application Priority Data

Mar. 20, 1989 [JP] Japan ................................. 1-30922
Mar. 20, 1989 [JP] Japan ................................. 1-30923

[51] Int. Cl.⁵ ...................... F16D 7/08; G01D 13/14; G01D 13/22
[52] U.S. Cl. ................ 192/56 R; 192/30 W; 116/332; 116/335; 464/36
[58] Field of Search .............. 192/56 R, 30 W, 110 R; 464/36; 116/212, 230, 278, 304, 309, 317, 319, 320, 327, 328, 332, 334, 335; 33/679.1; 73/866.3

[56] References Cited

U.S. PATENT DOCUMENTS

| | | | |
|---|---|---|---|
| 2,775,327 | 12/1956 | Gearhart | 192/56 R |
| 2,857,997 | 10/1958 | Graybill | 192/56 R X |
| 3,012,456 | 12/1961 | Dracka | 192/56 R X |
| 3,119,247 | 1/1964 | Grabovac | 464/36 |
| 3,786,693 | 1/1974 | Keipert | 464/36 X |
| 3,942,337 | 3/1976 | Leonard et al. | 464/36 |

FOREIGN PATENT DOCUMENTS 64-31301 1/1989 Japan.

Primary Examiner—Richard Lorence
Attorney, Agent, or Firm—Flynn, Thiel, Boutell & Tanis

[57] ABSTRACT

A tripping torque setting mechanism of an overload clutch having an adjusting nut threadedly engageable with a thread provided on a cylindrical part of a clutch hub, the adjusting nut being tightened against a spring to produce an urging force corresponding to a predetermined tripping torque. A helical line having a pitch coinciding with the pitch of said thread and indicia for indicating the angular positions is provided on one of the adjusting nut or a member which does not rotate relative to the nut, and an indicator is provided on the other. The axially adjacent portions of the helical line are indicated by different colors and the indicia for indicating the angular positions are indicated by the same color as the portion of the helical line to which the indicia correspond. The indicator has a bent portion at one end which is inserted radially outwardly into a hole formed in the clutch pressure plate and has an axially extending portion next to the bent position and held in a gap between the pressure plate and one of the clutch coil springs.

3 Claims, 7 Drawing Sheets

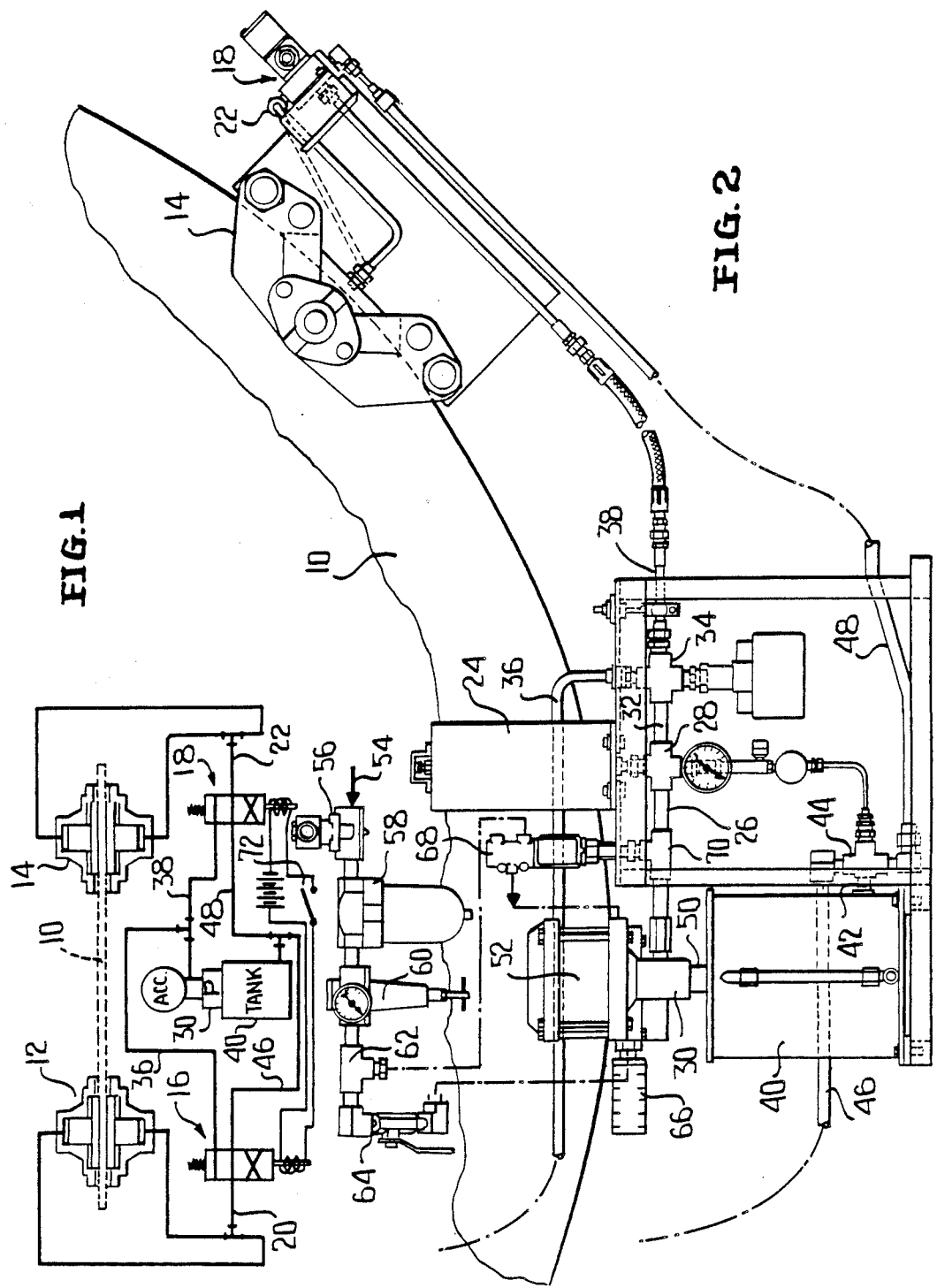

TRIPPING TORQUE SETTING MECHANISM OF OVERLOAD CLUTCH

FIELD OF THE INVENTION

This invention relates to a mechanism for setting the value of torque at which torque transmission may be shut off when a driven part in a power transmission mechanism encounters an overload. The value of such a torque is generally called "tripping torque".

BACKGROUND OF THE INVENTION

FIG. 1 shows an example of a tripping torque setting mechanism in a conventional overload clutch. It comprises an adjusting nut 63 which is adapted to be tightened, so as to obtain a desired value of the tripping torque, along an external thread provided on the outer surface of a cylindrical part 62 of a hub 61.

In Japanese Utility Model Application Laid-open No. 3130/1989, there is disclosed a mechanism in which setting of the tripping toque may be easily made. As illustrated in FIG. 1, the mechanism comprises a helical line 68 provided on the outer surface of the hub 61 such that the pitch of said helical line 68 coincides with that of said thread on the hub 61. The indicator 67 is provided on the nut 63. The tripping torque may be read on the basis of the rotational angle of the nut 63, namely, the positional relationship between the edge of the indicator 67 and the figures (i.e. numbers) represented along the helical line 68 so as to indicate the rotational angle.

However, as mentioned before, the pitch of the helical line 68 must be identical with that of the thread, and the figures as well as the marks for indicating the rotational angle are required to be indicated between two adjacent portions of said helical line 68. The spacing between said portions is, however, very small. Thus, in actuality, it may be difficult to determine to which portion of the two the indicator 67 corresponds.

Especially, in the event the spacing between the adjacent lines is small and the number of turns of the helical line 68 is relatively large, the corresponding relationship between the line and the figures becomes harder to determine, which may lead to an error in setting the tripping torque.

Furthermore, the indicator 67 is usually made of a bolt or a pin which is screwed or hammered into the pressure plate or the adjusting nut 63 so as to be fastened tightly thereto. Such being the fixing structure of the indicator, the indicator 67 is susceptible of loosening, which may lead to inaccurate reading of the indicator.

In addition, so as to prevent the indicator 67 from loosening, bonding by adhesives is usually employed. However, prevention of loosening by means of adhesives is not necessarily complete against vibration, etc. Needless to say, in case of breakage of such an indicator, replacement is virtually impossible.

SUMMARY OF THE INVENTION

The present invention is in the first place an improvement in such a tripping torque setting mechanism wherein the axially adjacent portions of the helical line are indicated by different colors and the figures (i.e. numbers) for indicating the angular positions are indicated by the same color as the portion of the helical line to which said figures correspond. Since the indicator is rotated so as to be tightened from the zero position shown by the indicator, it is relatively easy to determine along which portion of the helical line the indicator is moving.

In the first invention, the helical line and the figures representing the tripping torque are associated by means of the same color as a medium. Consequently, even if there are two figures sandwiching a portion of the line, an operator may easily determine which figure is to be adopted. The advantage of the first invention is more remarkable as the number of turns of the adjusting nut increases.

If the helical line and the figures are indicated on a scale tape which may be adhesively bonded to the adjusting nut, a tripping torque setting mechanism may be easily obtained.

The present invention is, in the second place, in an overload clutch having a tripping torque indicator as mentioned above, and an indicator mounting structure, wherein a bent portion at one end of said indicator is radially outwardly inserted into a hole provided in a pressure plate, and an axially extending portion of the indicator next to said bent portion is held in the gap between the pressure plate and one of the coil springs.

According to the second invention, the indicator may be prevented from moving both axially and circumferentially by the bent portion; and further prevented from moving radially as it is held in the gap between the pressure plate and the coil springs. Thus, the indicator may be securely held in position by the component parts of the overload clutch. As a result, assembly as well as replacement is easy.

BRIEF DESCRIPTION OF THE DRAWINGS

FIGS. 2 to 10 illustrate embodiments of this invention in which:

FIG. 2 is an overall axial section of the overload clutch;

FIG. 3 is a front view of a pressure plate;

FIG. 4 is a section at line IV—IV of FIG. 3;

FIG. 5 is a perspective view of an indicator;

FIG. 6 is a side view of the indicator;

FIGS. 7 and 8 illustrate how the indicator is mounted to the pressure plate;

FIG. 9 is a plan view of a scale tape (the proportion between the abscissa and ordinate is exaggerated); and FIG. 10 is a diagram for reading tripping torque from the figures indicated on the adjusting nut.

EMBODIMENTS

Figure 2:
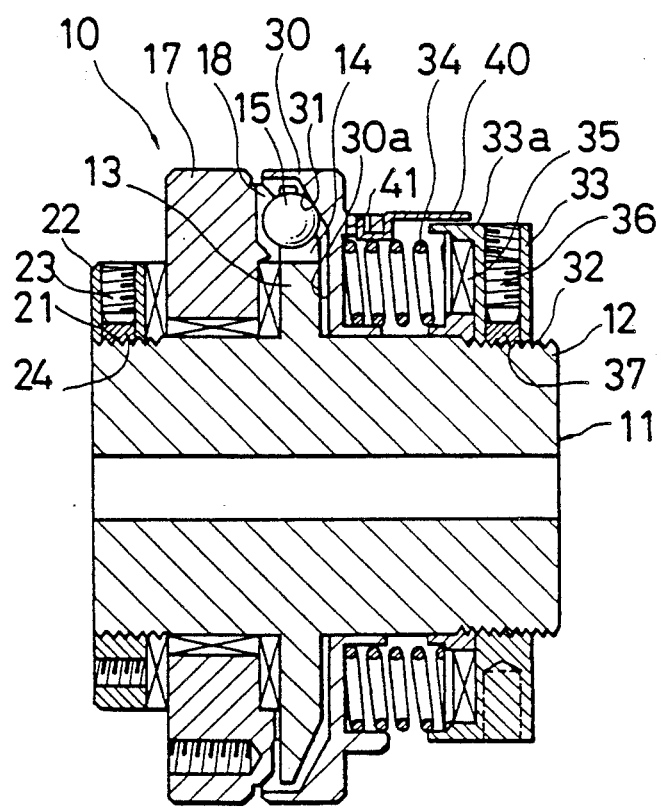

FIG. 2 shows on overload clutch 10 according to the present invention.

The driving hub 11 has a collar 13 at the axially intermediate portion of the cylindrical part 12. A plurality of outwardly extending V-shaped notches 14 are radially formed in collar 13 at irregular angular intervals so as to restrict the point of engagement of the driving part and the driven part to only one. Steel balls 15 are urged into these notches 14.

A disk-like driven plate 17 is provided to the left of the collar 13 at the left portion of the cylindrical part 12 so as to be rotatably supported by means of a radial bearing 16. On the righthand surface of the driven plate 17, a plurality of V-shaped grooves 18 are radially disposed so as to correspond to the notches 14 of the collar 13. There are flat surface portions between each pair of adjacent grooves 18.

At the lefthand end of the cylindrical part 12, a thread 21 is formed to which a fixing nut 22 is fastened. The fixing nut 22 is used to urge the driven plate 17 toward the pressure plate 30. A thrust bearing 20 is disposed between nut 22 and plate 17. The tip of a screw 23 presses a plug 24 into the thread 21 so as to prevent the fixing nut 22 from loosening.

The pressure plate 30 is mounted to the righthand portion of the cylindrical part 12 with a radial clearance therebetween. On the surface 30a of the pressure plate 30 opposing the collar 13, an inclined surface 31 comprising a truncated cone is formed adjacent the outer periphery thereof. The inclined surface 31 functions to urge the balls 15 toward the notches 14 and the V-shaped grooves 18 by means of the coil springs 34 as described later.

An adjusting nut 33 engages with a thread 32 formed at the righthand end of the cylindrical part 12. The adjusting nut 33 functions to adjust the urging force of the coil springs 34 disposed between the pressure plate 30 and the nut 33, with a thrust bearing 35 being disposed therebetween. The nut 33 may be prevented from loosening by means of the locking plug 37 and the screw 36.

The tripping torque setting mechanism according to the present invention comprises an indicator 40 and a scale tape 50 which is wound around the exterior cylindrical surface of the adjusting nut 33 and adhesively bonded thereto.

Figure 3:
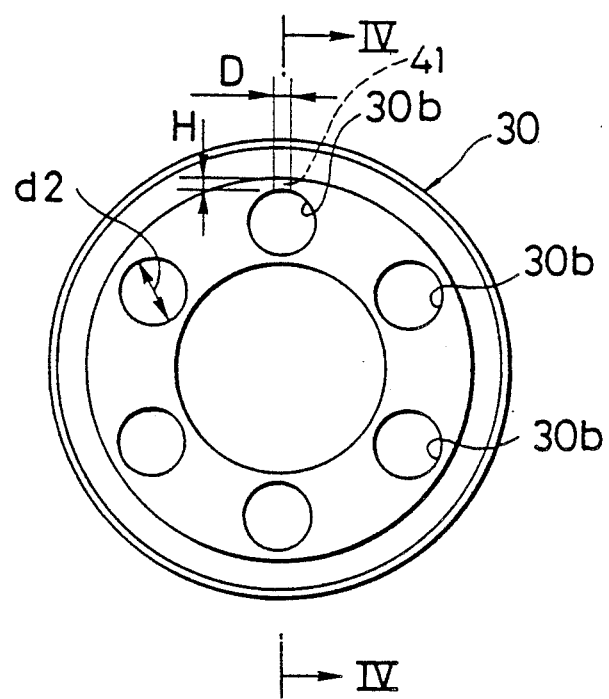
Figure 4:
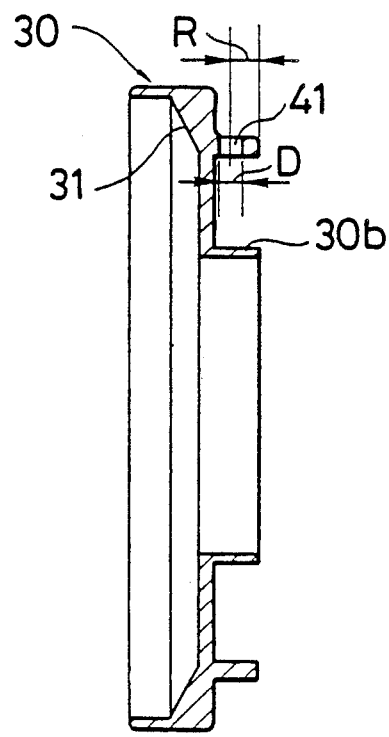

As shown in FIGS. 3 and 4, a plurality of circular recesses 30b are formed on the pressure plate 30 at the opposite side from the inclined surface 31 for mounting the ends of the coil springs 34. The diameter d2 of the recess 30b is slightly greater than the diameter d1 (FIG. 8) of the coil springs 34. One of the recesses 30b is formed with a radial hole 41, the diameter and length of which are D and H respectively. R represents the distance between the center of the hole 41 and the righthand annular end surface of the pressure plate 30 as shown in FIG. 4.

The indicator 40 (FIGS. 5 and 6) is made of a plate which has bent portions. Namely, the indicator 40 comprises a first bent portion 43, an axially extending portion 44, a second bent portion 46 and a pointer portion 45. The indicator 40 is inserted radially outwardly into the hole 41 of the pressure plate 30.

The width W of the bent portion 43 is almost equal to the diameter D of the hole 41 so as to closely fit thereinto. The overall width of the indicator 40 is almost the same as H. Further, the length L1 of the bent portion 43 is almost equal to or slightly shorter than the length H of the hole 41 so that it will not protrude from the hole 41 after it has been inserted thereinto. The inside length L2 of the axially extending portion 44 is almost equal to or slightly shorter than R so that the indicator 40 may be secured to the pressure plate 30 by means of the two bent portions 43 and 46. The thickness T of the indicator 40 is d1 minus d2 so as to fit into the gap between the recess 30b and one of the coil springs 34. For example, d1 is 13.00 mm, d2 is 12.2 mm and the thickness T is 0.8 mm. The length L3 of the pointer portion 45 may be selected such that the free end or tip 47 thereof may point to the figures represented on the outer surface 33a of the adjusting nut 33.

Figure 7:
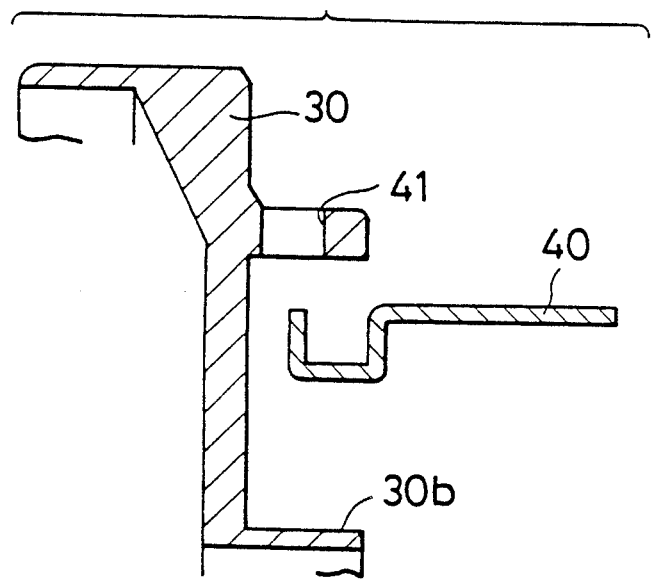
Figure 8:
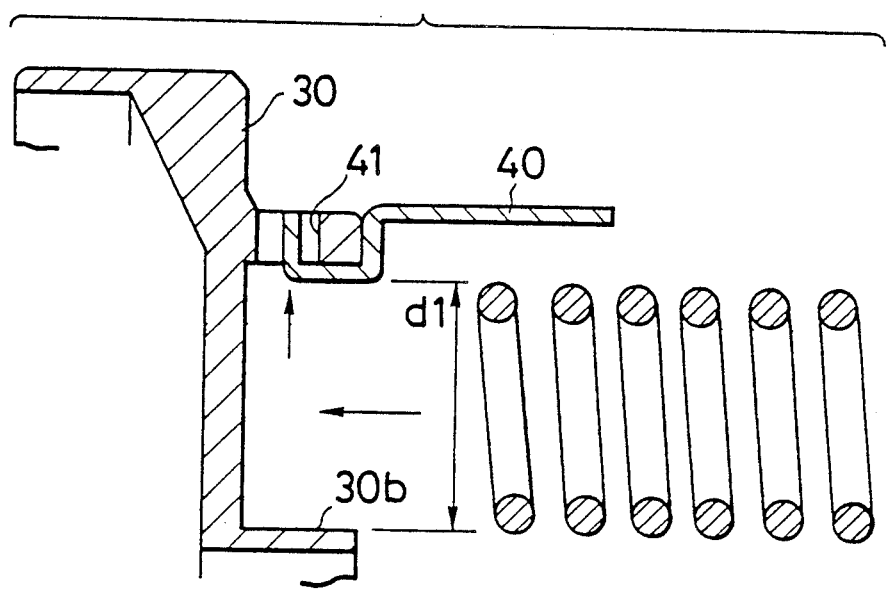

In order to mount the indicator 40 to the overload clutch 10, the pressure plate 30 is first brought to the cylindrical part 12 of the hub 11; and then, as shown in FIG. 7, the first bent portion 43 is inserted into the hole 41 from inside of the recess 30b. The channel structure defined by walls 43, 44 and 46 in effect grips, as by a slight interference fit, the edge of the pressure plate as shown in FIG. 8. Thus, the indicator 40 is prevented from moving both axially and circumferentially. Thereafter, the coil springs 34 are set into the recesses 30b; and the adjusting nut 33 is fastened from the righthand end of the cylindrical part 12. The axially extending portion 44 of the indicator 40 may be prevented from radially moving as it is held in the gap between the recess 30b and one of the coil springs 34. Although the indicator 40 may be prevented from coming off of the pressure plate by the interference fit of the bent portions 43 and 46, it is preferable to hold the indicator 40 between the pressure plate 30 and one of the coil springs 34 to more positively prevent the indicator 40 from falling or coming loose.

The indicator 40 may be in the form of an elongated rod instead of a plate. It may be made of either metal or plastics. In case of the former it may be formed by bending, and in case of the latter it may be formed by molding.

The scale tape 50 is adhesively bonded to the outer periphery 33a of the adjusting nut 33. The indicator 40 is adapted to indicate the figures shown on the tape 50.

Figure 9:
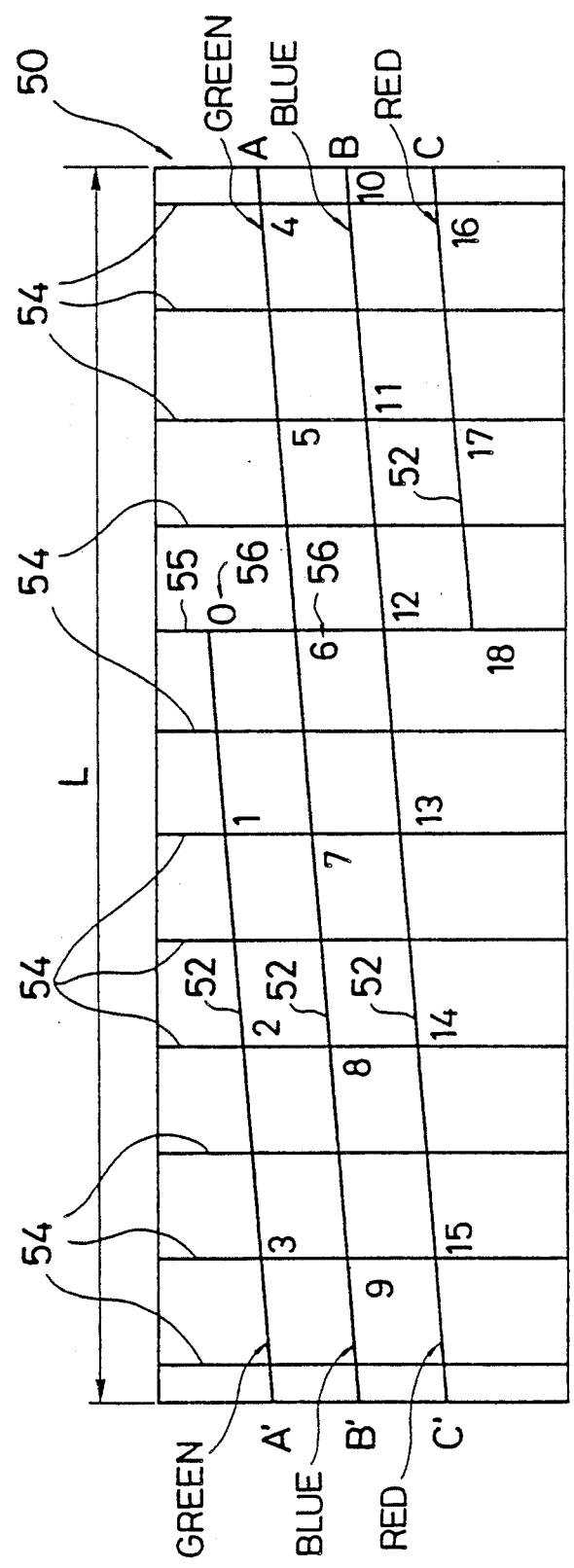

On the scale tape 50 (FIG. 9) are printed transverse lines 52 and longitudinal lines 54 as well as the FIGS. 56 at the crossing points of these lines. The length L of the tape 50 is such that a predetermined helical line is completed when it is wound around the outer periphery of the adjusting nut 33 as explained later. The transverse (helical) lines 52 are inclined with respect to the axial direction; and they are equally spaced with each other. The spacing is equal to the pitch of the thread 32. When applied to the adjusting nut 33, each transverse line forms a complete helical revolution as points A, B and C meet the points A', B' and C', respectively. The longitudinal (axial) line 55 is the reference line. The top edge of the indicator 40 will coincide with the reference line 55 when the pressure plate 30 does not impart an urging force to the balls 15, and when the adjusting nut 33 has just turned 1~n turns (n: integer). The other longitudinal lines 54 indicate the rotational angle of the adjusting nut 33.

It should be appreciated that the above described embodiments are shown for illustrative purposes only; they should not be interpreted as limiting the invention. For example, the scale tape may be provided on the adjusting nut or on a member which does not rotate relative to said nut, and the indicator may be provided on the other.

The scale tape 50 is adhesively bonded to the adjusting nut 33 such that the leading edge of the indicator 40 coincides with the crossing point at which the helical line 52 meets the reference line 55 when there is no pressing force due to the coil springs 34. Then, as the adjusting nut 33 is turned, the leading edge of the indicator 40 moves along the helical line 52; and it passes the reference line 55 as it accomplishes one turn. Therefore, the transverse or helical lines 52 and the longitudinal lines 54 will indicate the amount of axial movement and the rotational angle of the adjusting nut 33, respectively.

The transverse (helical) lines 52 are indicated by different colors per each turn; namely, a first turn is green, a second turn is blue, and an n-th turn is red, for example. This would result in the axially adjacent portions being of different colors. It is simple and preferable to use different colors for every one turn; however, it should be noted that use of different colors for less than one turn, for example, for 270 degrees or for 180 degrees may also be employed. In that case, a greater number of different colors will of course be needed.

Figure 10:
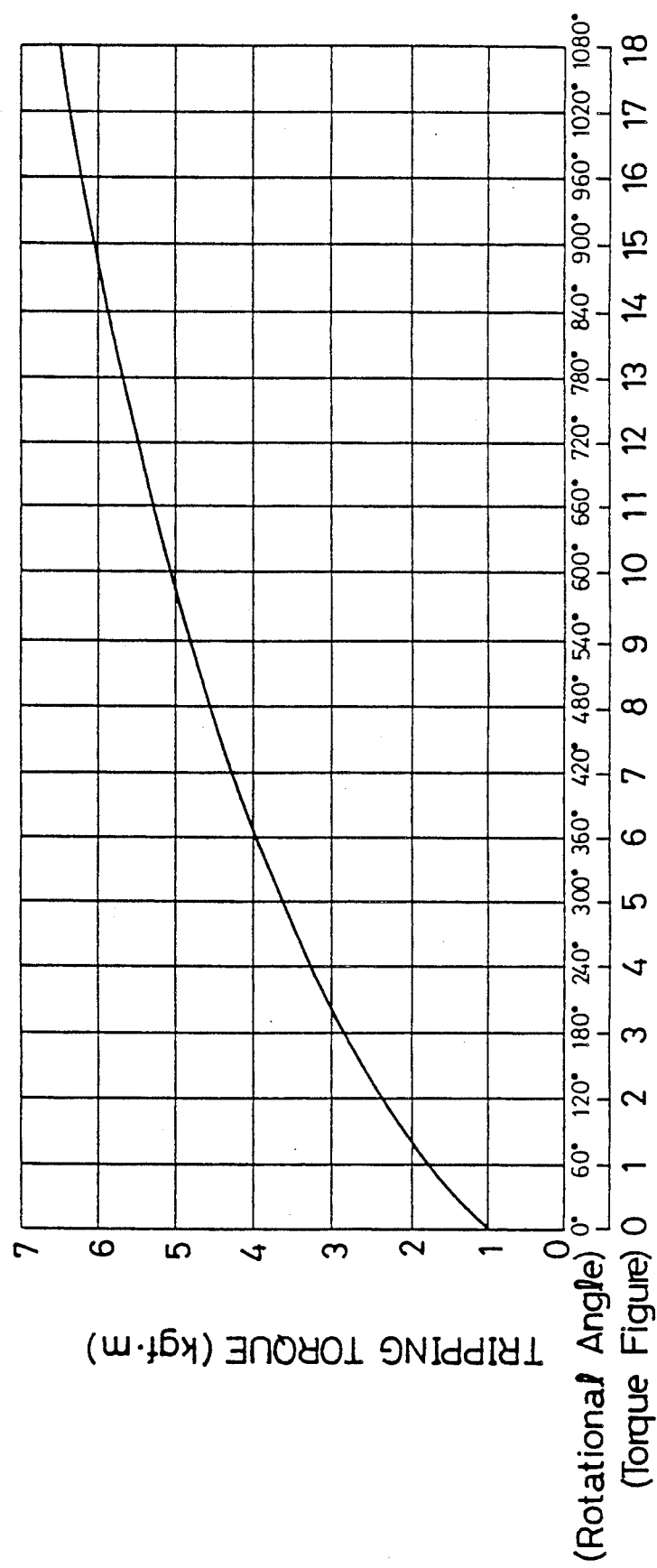

The figures or numbers 56 are located at the crossing points of the transverse lines 52 and the longitudinal lines 54 so as to show the rotational angle of the adjusting nut 33. The figures may be translated into the value of the actual tripping torque by means of a diagram as shown in FIG. 10.

The FIGS. 56 are indicated by the same color as that of the corresponding transverse lines 52. That is, the FIGS. 0 to 6 are shown by green, 7 to 12 are shown by blue, and 13 to 18 are shown by red. Since the indicator 40 moves along the helical line, the figure represented by the same color as that of the portion of the helical line in question will indicate the rotational angle of the indicator 40, namely, the tripping torque.

Although the spacing between the adjacent portions of the helical line 52 is extremely small, the portions of the helical line and the figures are associated with color as a medium. Thus, the correct figure which the indicator is showing may be read quite easily.

The scale may advantageously be attached to the adjusting nut by adhesive bonding of a tape after removing a releasing or backing paper. However, it is of course possible to instead provide the figures and helical line by various means of marking.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a tripping torque setting mechanism of an overload clutch comprising an adjusting nut threadedly engageable with a thread provided on a cylindrical part of a clutch hub, said adjusting nut being tightened against a spring to produce an urging force corresponding to a predetermined tripping torque, a helical line having a pitch coinciding with the pitch of said thread and figures for indicating the angular positions being represented by one of the adjusting nut or a member which does not rotate relative to said nut, and an indicator being provided on the other, the improvement wherein the axially adjacent portions of said helical line are indicated by different colors and said figures for indicating the angular positions are indicated by the same color as the portion of the helical line to which said figures correspond.

2. In a tripping torque setting mechanism of an overload clutch comprising an adjusting nut threadedly engageable with a thread provided on a cylindrical part of a clutch hub, said adjusting nut being tightened against coil springs to produce an urging force on a pressure plate corresponding to a predetermined tripping torque, including an indicator for reading a tripping torque, the improvement wherein said indicator has a bent portion at one end which is inserted radially outwardly into a hole formed in said pressure plate and has an axially extending portion next to said bent portion and held in a gap between the pressure plate and one of the coil springs.

3. A tripping torque scale tape of an overload clutch printed with helical line elements such that they form a complete helical line when wound in a circle having a predetermined diameter and angular positional figures represented at positions equally dividing the circle, wherein the axially adjacent portions of said helical line are indicated by different colors and said figures for indicating the angular positions are indicated by the same color as the portion of the helical line to which said figures correspond.

* * * * *

UNITED STATES PATENT AND TRADEMARK OFFICE
CERTIFICATE OF CORRECTION

Figure 1:
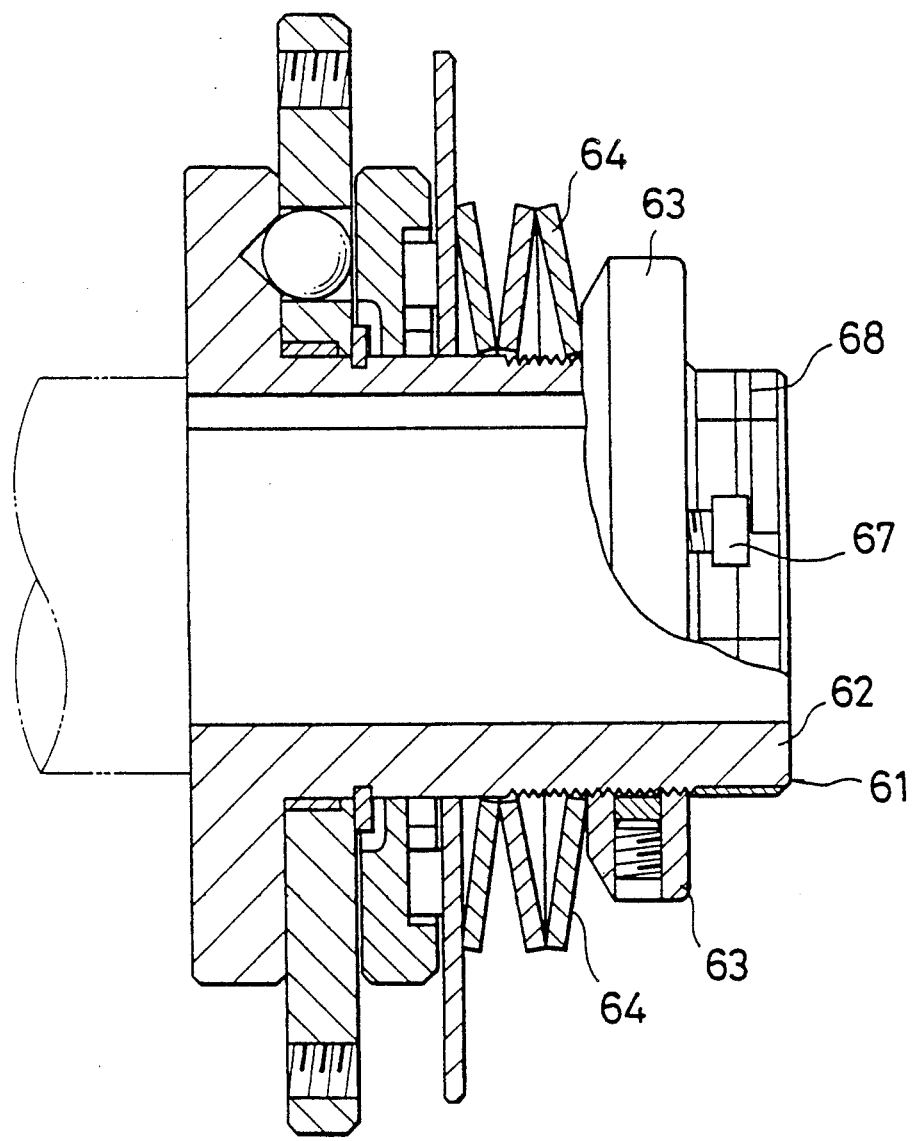
FIG. 1 is an axial section of a conventional overload clutch.

PATENT NO. : 4,991,701   Page 1 of 2
DATED : February 12, 1991
INVENTOR(S) : Isamu Nakano et al It is certified that error appears in the above-identified patent and that said Letters Patent is hereby corrected as shown below:

In the Drawings:

Please cancel Sheet 1 containing Figures 1 and 2 and substitute therefor Figures 5 and 6 as appearing below:

FIG. 5

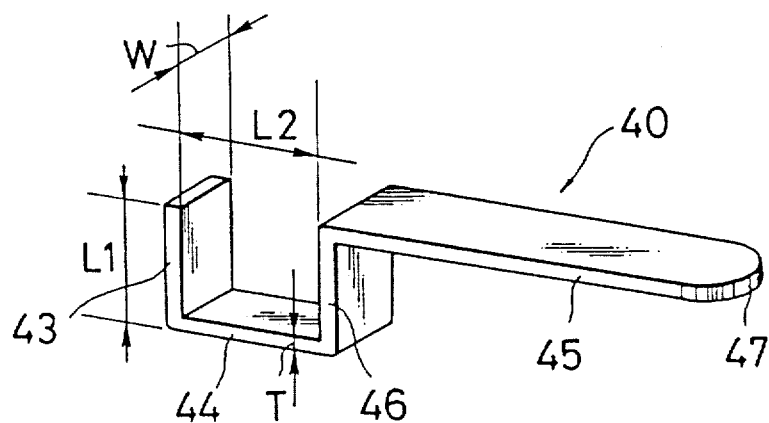

UNITED STATES PATENT AND TRADEMARK OFFICE
CERTIFICATE OF CORRECTION

PATENT NO. : 4 991 701
DATED : February 12, 1991
INVENTOR(S) : Isamu Nakano et al It is certified that error appears in the above-identified patent and that said Letters Patent is hereby corrected as shown below:

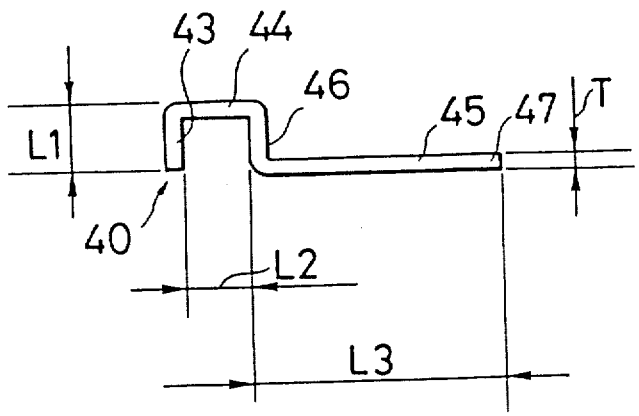

FIG.6

Signed and Sealed this

Eighth Day of June, 1993

Attest:

MICHAEL K. KIRK

Attesting Officer

Acting Commissioner of Patents and Trademarks